United States Patent
Carter

[19]

[11] Patent Number: 5,988,079

[45] Date of Patent: *Nov. 23, 1999

[54] UNBURNED CARBON AND OTHER COMBUSTIBLES MONITOR

[75] Inventor: Hudson R. Carter, Forest, Va.

[73] Assignee: Framatome Technologies, Inc., Lynchburg, Va.

[ * ] Notice: This patent is subject to a terminal disclaimer.

[21] Appl. No.: 08/925,340

[22] Filed: Sep. 8, 1997

Related U.S. Application Data

[63] Continuation-in-part of application No. 08/372,604, Jan. 13, 1995, abandoned.

[51] Int. Cl.$^6$ ............................... F23N 5/00; F23N 5/18
[52] U.S. Cl. .................... 110/185; 110/186; 110/188; 110/191; 110/234; 431/12; 431/76; 348/83
[58] Field of Search .................... 110/185, 186, 110/188, 187, 190, 234, 191; 431/8, 12, 75, 79, 76; 236/15 R, 15 E; 348/82, 83

[56] References Cited

U.S. PATENT DOCUMENTS

| | | | |
|---|---|---|---|
| 4,043,743 | 8/1977 | Seider | 431/79 X |
| 4,690,634 | 9/1987 | Herngren et al. | 431/8 |
| 4,814,868 | 3/1989 | James | 358/100 |
| 4,969,408 | 11/1990 | Archer et al. | 110/347 |
| 5,010,827 | 4/1991 | Kychakoff et al. | 110/185 |
| 5,069,551 | 12/1991 | Brown | 356/423 |
| 5,112,215 | 5/1992 | Frish et al. | 431/76 X |
| 5,196,170 | 3/1993 | Patashnick et al. | 431/76 X |
| 5,231,939 | 8/1993 | Tanaka et al. | 110/186 X |
| 5,252,060 | 10/1993 | McKinnon et al. | 431/76 X |
| 5,488,916 | 2/1996 | Bozzuto | 110/347 |
| 5,599,179 | 2/1997 | Lindner et al. | 431/76 X |
| 5,774,176 | 6/1998 | Carter | 348/83 |

*Primary Examiner*—Ira S. Lazarus
*Assistant Examiner*—Ljiljana V. Ciric
*Attorney, Agent, or Firm*—Rhodes & Mason, PLLC

[57] ABSTRACT

An unburned carbon and other combustibles monitoring and control system for a fly ash producing fossil-fueled boiler, such as a pulverized coal fired boiler. An infrared imaging camera counts the moving hot particles entrained in the hot gases downstream of the furnace region of the boiler and provides a first signal representative of the number of hot particles in the hot gases over a predetermined period of time. A signal processor is connected to the infrared imaging camera for counting the hot particles for receiving the signal representative of the number of particles in the hot gases and providing a second signal representative of the mass flow of unburned carbon and other combustibles content of the fly ash produced by the boiler, the second signal being a function of the first signal. In the preferred embodiment, the apparatus includes at least one air/fuel control element for controlling the air/fuel ratio of the fossil-fueled boiler and a control system connected to the control element for receiving the second signal representative of the mass flow of unburned carbon and other combustibles content of the fly ash produced by the boiler and a predetermined set point for the mass flow of unburned carbon and other combustibles content of the fly ash produced by the boiler, the control system being operable to adjust the air/fuel control element in response to the second signal and the set point.

31 Claims, 4 Drawing Sheets

5,988,079

UNBURNED CARBON AND OTHER COMBUSTIBLES MONITOR

CROSS-REFERENCE TO RELATED APPLICATIONS

The present application is a Continuation-in-Part of U.S. application Ser. No. 08/372,604, filed Jan. 13, 1995, now abandoned.

BACKGROUND OF THE INVENTION

(1) Field of the Invention

The present invention relates generally to combustion monitoring systems and, more particularly, to an apparatus for precisely monitoring the unburned carbon and other combustibles, such as hydrogen and sulfur, content produced by a fossil-fueled boiler.

(2) Description of the Prior Art

Loss on Ignition (LOI) measurements are becoming increasingly important for utility coal fired plants for several reasons. For example, the low NOx burners that are being installed by a large percentage of coal fired plants produce higher LOI than the burners being replaced, even when the new burners are optimally tuned, and excessive amounts when the burners are poorly tuned. If the LOI of the fly ash increases, the plant must burn more coal to produce the same power (degrading plant heat rate). In addition, the higher carbon content fly ash may not be salable for use as building material, loadings on the bottom ash and fly ash systems will increase, and stack opacity may increase. Accordingly, it has become important to obtain reliable and timely mass flow of unburned carbon and other combustibles content ($M_{UBC}$) measurements.

Most plants currently determine LOI by extracting an ash sample from the precipitator or baghouse hoppers or by isokinetic samples located, typically, downstream of the air heater and then use an ASTM procedure (% weight loss) to determine the unburned carbon and other combustibles content. Typically, this determination is performed once a day. The ASTM procedure takes about 4 hours to complete. Since real time information is not currently available, burner tuning and control to balance emissions (NOx) and efficiency (LOI) is very difficult at best.

There have been several attempts to provide an automatic LOI system on the market. These systems attempt to automatically extract an ash sample from the boiler and conduct the ASTM procedure on-line to produce a semi-real time indication. However, these systems have generally been unreliable and expensive due to mechanical problems associated with extracting hot and abrasive particles from a boiler. Specifically, the ash lines clog and corrode due to heat. Also, there is the question of whether a single measurement which, at best, produces only a single point value rather than a real time measurement is representative or not.

Thus, there remains a need for a new and improved $M_{UBC}$, monitor which is operable to provide a real time indication of fly ash LOI.

SUMMARY OF THE INVENTION

The present invention is directed to an unburned carbon and other combustibles monitoring and control system for a fossil-fueled boiler, such as a pulverized coal fired boiler.

The carbon and other combustible particles in the pulverized coal ignite in the burner region of the furnace. Depending on the furnace temperature, the residence time of the particles in the furnace and the availability of oxygen to support combustion, the particles, as they exit the furnace, are completely consumed, smolder or extinguish. The measurement system detects the combustible particles that are smoldering or just extinguishing as they pass from the furnace to the boiler region where the temperature is below the particle ignition temperature (about 1000° F. for carbon in coal). In this transition region, the carbon and other combustible particles are hotter than the inert particles, surrounding gas and boiler structures.

An imaging camera counts the moving hot particles entrained in the hot gases exiting the furnace and provides a first signal representative of the number of hot particles in the hot gases over a predetermined period of time. In the preferred embodiment, the measuring system uses a near infrared (NIR) imaging camera which is optically filtered to enhance resolution between hot and cool particles or surfaces. A hot unburned combustible particle will be observed as a white spot traversing the camera's field of view. The camera images are processed to produce a quantitative reading of the number (counts per minute) of spots passing through the camera's field of view.

A processing means, such as a signal processor, is connected to the infrared imaging camera for receiving the signal representative of the counts per minute of particles in the hot gases and providing a second signal representative of the unburned carbon and other combustibles content of the fly ash produced by the boiler. It has been surprisingly discovered that the mass flow of unburned carbon and other combustibles content ($M_{UBC}$) of the fly ash being produced by the boiler is substantially related to the hot particle count (CPM) according to the formulas: $M_{UBC}=m(CPM)+b(SIS-SIS_R)$, where m is the slope and b is the y-intercept and % $LOI=C_1+C_2(CPM/LOAD)+C_3(SIS-SIS_R)$ where LOAD is boiler load in megawatts and $SIS-SIS_R$ is the difference between the scene illumination sensor output at load and the scene illumination sensor output at its reference point.

In the preferred embodiment, the apparatus includes at least one air/fuel control element for controlling the air/fuel ratio of the fossil-fueled boiler and a control system connected to the control element for receiving the second signal representative of the mass flow of unburned carbon and other combustibles content of the fly ash produced by the boiler and a predetermined set point for the unburned carbon and other combustibles content of the fly ash produced by the boiler, the control system being operable to adjust the air/fuel control element in response to the second signal and the set point.

Accordingly, one aspect of the present invention is to provide an unburned carbon and other combustibles monitoring and control system for a fossil-fueled boiler, the boiler including at least one burner, a furnace section, and an exit for the hot gases produced by the boiler. The apparatus includes: (a) means for counting moving hot particles entrained in the hot gases and providing a first signal representative of the number of hot particles in the hot gases over a predetermined period of time; and (b) processing means connected to the means for counting the hot particles for receiving the signal representative of the number of particles in the hot gases and providing a second signal representative of the unburned carbon and other combustibles content of the fly ash produced by the boiler.

Another aspect of the present invention is to provide an unburned carbon and other combustibles monitoring system for a fossil-fueled boiler, the boiler including a furnace section and an exit for the hot gases produced by the boiler.

The apparatus includes: (a) an infrared imaging camera for counting moving hot particles entrained in the hot gases and providing a first signal representative of the number of hot particles in the hot gases over a predetermined period of time; and (b) processing means connected to the means for counting the hot particles for receiving the signal representative of the number of particles in the hot gases and providing a second signal representative of the unburned carbon and other combustibles content of the fly ash produced by the boiler, the mass flow of unburned carbon and other combustibles content ($M_{UBC}$) being substantially related to the hot particle count (CPM) according to the formulas: $M_{UBC}$=m(CPM)+b(SIS-$SIS_R$), where m is the slope and b is the y-intercept and % LOI=$C_1$+$C_2$(CPM/LOAD)+$C_3$(SIS-$SIS_R$).

Still another aspect of the present invention is to provide an unburned carbon and other combustibles monitoring and control system for a fossil-fueled boiler, the boiler including at least one burner, a furnace section, and an exit for the hot gases produced by the boiler. The apparatus includes: (a) an infrared imaging camera for counting moving hot particles entrained in the hot gases and providing a first signal representative of the number of hot particles in the hot gases over a predetermined period of time; (b) processing means connected to the infrared imaging camera for counting the hot particles for receiving the signal representative of the number of particles in the hot gases and providing a second signal representative of the unburned carbon and other combustibles content of the fly ash produced by the boiler, the mass flow of unburned carbon and other combustibles content ($M_{UBC}$) being substantially related to the hot particle count (CPM) according to the formulas: $M_{UBC}$=m(CPM)+b(SIS-$SIS_R$), where m is the slope and b is the y-intercept and % LOI=$C_1$+$C_2$(CPM/LOAD)+$C_3$(SIS-$SIS_R$); and (c) at least one air/fuel control element for controlling the air/fuel ratio of the fossil-fueled boiler and a control system connected to the control element for receiving the second signal representative of the unburned carbon and other combustibles content of the fly ash produced by the boiler and a predetermined set point for the unburned carbon and other combustibles content of the fly ash produced by the boiler, the control system being operable to adjust the air/fuel control element in response to the second signal and the set point.

These and other aspects of the present invention will become apparent to those skilled in the art after a reading of the following description of the preferred embodiment when considered with the drawings.

DESCRIPTION OF THE PREFERRED EMBODIMENTS

Figure 1:
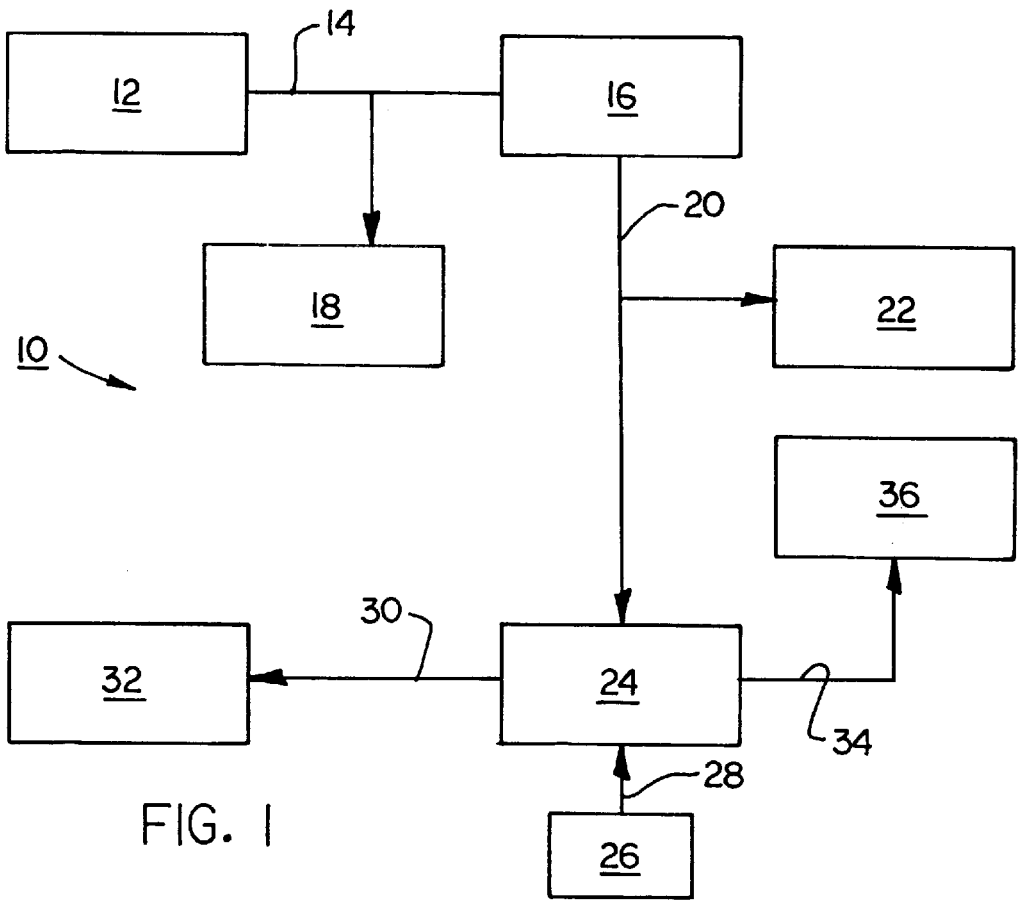
FIG. 1 is a block diagram illustrating an unburned carbon and other combustibles measuring apparatus for a fossil-fueled boiler constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, an unburned carbon and other combustibles ($M_{UBC}$) measuring apparatus, generally designated 10, for a fossil-fueled boiler is shown constructed according to the present invention. The $M_{UBC}$ measuring apparatus includes three major subassemblies: an apparatus for imaging and counting the moving hot particles; a control system for receiving a signal representative of the count per minute of the moving particles and converting this data to an indication of the mass flow of unburned carbon and other combustibles content; and a display for displaying the value of the mass flow of unburned carbon and other combustibles content. In addition, in the preferred embodiment, the control system may be utilized to provide a control signal to automatically control the air-fuel ratio of the fuel and air entering the boiler to automatically optimize the unburned carbon and other combustibles content produced by the boiler.

In the preferred embodiment, the apparatus for counting the moving particles includes an imaging camera 12 for providing an output signal 14 to an image processor 16. In the preferred embodiment, output signal 14 is also received by a CRT display 18 for providing a visual display of the output of the imaging camera. Imaging processor 16 provides a second signal 20 representative of the counts per minute of moving particles to a CPM display 22.

One such device which has been used to provide this information is a model M601A manufactured by Quadtek, Inc. of Redmond, Wash. The operation of this device is set forth in U.S. Pat. No. 4,814,868, issued to James, the entire disclosure of which is hereby incorporated by reference. Another type of this device is set forth in U.S. Pat. No. 4,690,634, issued to Herngren et al., the entire disclosure of which is hereby incorporated by reference.

By adjusting the threshold sensitivity of such a device, this device can be used to discriminate between particles of inorganic ash and particles of unburned carbon and other combustibles. The imaging sensor uses a near infrared (NIR) wavelength and is optically filtered to enhance resolution between hot and cool particles and surfaces. A hot particle will be observed as a white spot traversing the screen on the black and white monitor. These white spots are counted, providing the counts per minute (CPM) which is substantially related to the plant measured LOI.

Such a device provides the advantages of being non-obtrusive, optical, real time, and having a large included field, i.e., not a point measurement. However, such a system has been used in the past only for monitoring the carry-over particles in boilers used to recover pulping chemicals from the "black liquor" produced during wood pulping process.

The present invention is based on the surprising discovery that there is a direct correlation between the counts per minute of moving hot particles seen by the imaging camera and the actual value of mass flow of unburned carbon and other combustibles in the fuel ash. The concept of using the imaging system is based on the assumption that the unburned carbon and other combustibles particles will be hotter than the background gases or boiler structure. It is assumed that the carbon and other combustibles particles are still burning or have stopped burning leaving the particle temperature higher than the surroundings.

As further shown in FIG. 1, control signal 20 representative of the counts per minute of moving hot particles is received by proportional controller 24. Based on the discovery that the mass flow of unburned carbon and other combustibles content of the fly ash is substantially related to the counts per minute, the control system 24 provides an output signal representative according to the relationship $M_{UBC}=m(CPM)+b(SIS-SIS_R)$ and % $LOI=C_1+C_2(CPM/LOAD)+C_3(SIS-SIS_R)$. This value, in the preferred embodiment, is compared against a preset set point 26 which provides a control signal 28 received by the control system 24. The control system 24 then provides an output signal 30 to control element 32.

Control element 32 varies the air-fuel ratio being received by the fossil fuel boiler either by varying the amount of air or by varying the amount of pulverized coal or other fossil fuel entering the boiler. Also, in the preferred embodiment, the control system 24 provides an output signal 34 representative of the value of the mass flow of unburned carbon and other combustibles content which is displayed on CRT display 36.

Figure 2:
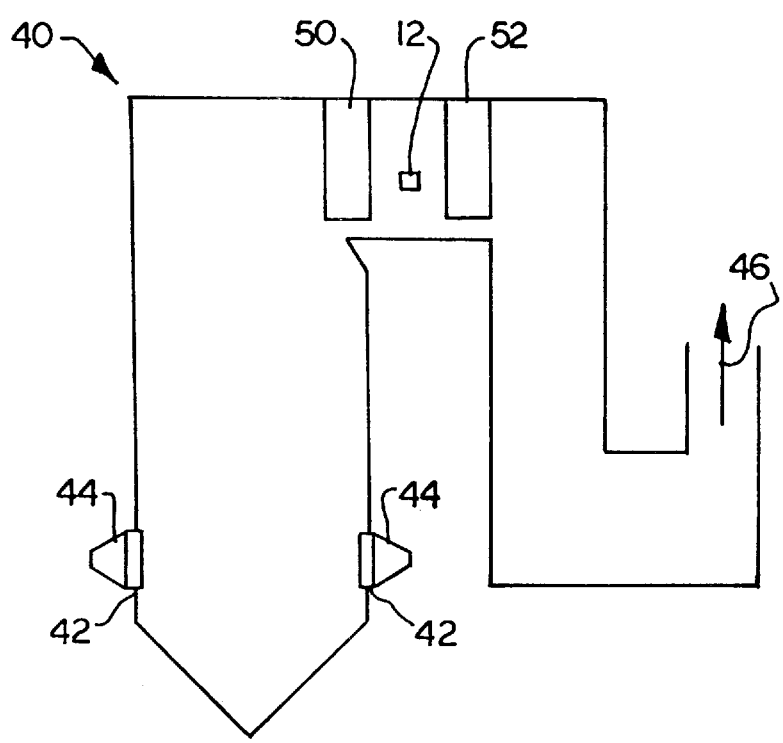
FIG. 2 is a schematic representation illustrating the location of the imaging camera of the present invention in the fossil-fueled boiler.

FIG. 2 is a schematic representation illustrating the preferred location of the imaging camera 12 of the present invention in a fossil-fueled boiler, generally designated 40. The boiler 40 shown is representative of a conventional boiler having at least one burner 42 and a damper control 44 associated with the burner. Hot exhaust gas outlet 46 carries the hot gases from the boiler to a stack (not shown). The boiler includes a finishing super-heater 50 and a low pressure reheater 52. Based on experimentation, a location downstream of the finishing super-heater 50 and upstream of the low pressure reheater 52 appears to produce the most repeatable results of the CPM count. For boilers not having this configuration, the measurement is made outside the combustion region in the transition region in which temperatures are higher than the coal ignition temperature and the region in which the temperatures are below the coal ignition temperature.

EXAMPLE 1

A Quadtek video imaging system was used for the testing. The system consisted of an imaging sensor, a processor, black and white video monitor, and a color video monitor. The boiler was a 350 MW Combustion Engineering (CE) super-critical boiler. The unit was brought on line in 1969. The new burners are CE LNCF (low NOx concentric firing) Level 3 burners. The plant burns high volatile (30%), high carbon (50%) Illinois basin coal. Based on short term observations, the plant experiences little to no furnace or convection pass slagging/fouling. The imaging sensor was located in a boiler door porthole opening at the 783'-6" elevation, 32'-3 ¾" from the furnace center line along the south wall between the finishing superheater and low pressure reheater (see FIG. 2). The gas temperatures in this area, as provided by the plant PMAX system, ranged from 2200° F. max. exiting the finishing superheater, to 1100° F. min. entering the low pressure reheater. The ash samples for comparison were removed from 6 of the 32 precipitator hoppers for LOI determination. Hoppers 7, 14, and 16 from precipitator 1, and hoppers 13, 14, and 16 from precipitator 2, were determined to provide representative ash samples for LOI determination. A daily sample was taken at the start of the day shift and represented ash since the previous ash conveying process. For the purpose of this test, and the burner tuning tests, additional ash samples were taken at various times during the day shift. In an effort to obtain plant measured LOI data for direct comparison with real time imaging system counts per minute (CPM) measurements, the ash conveying strip chart data was reviewed. The strip chart allowed an estimate of the LOI for direct comparison to be made by considering the time of last hopper conveying, time to re-fill hopper to sample elevation, and conveying duration. Isokinetic samples were also taken towards the end of the testing period in an effort to provide more accurately timed LOI samples for comparison. The two isokinetic samplers were installed in the air flow just prior to the north and south air heater hoppers.

Figure 3:
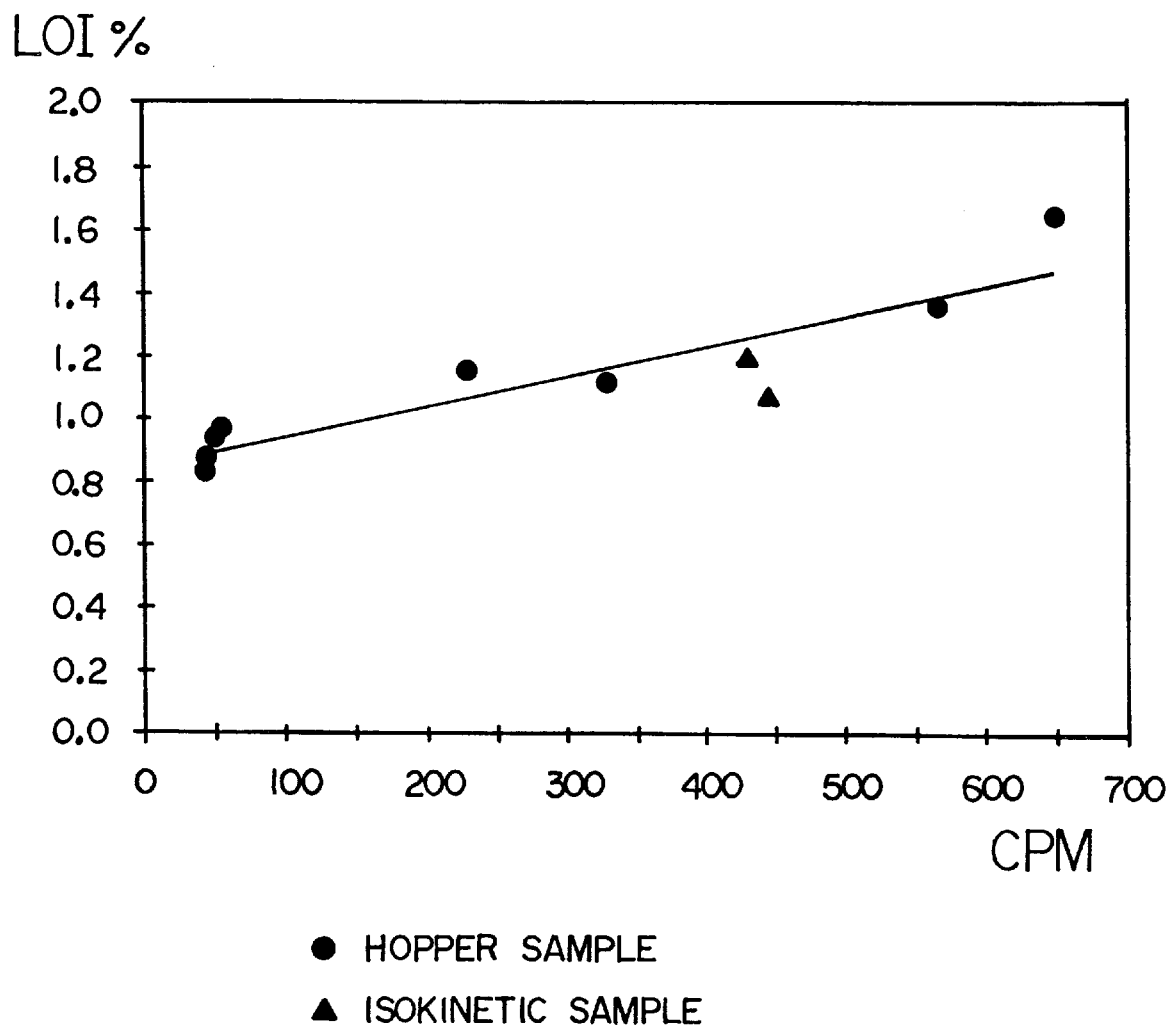
FIG. 3 is a graphical representation of the plant measured LOI vs. the imaging system measured CPM;.

FIG. 3 compares the plant measured LOI and imaging system measured CPM. This data is considered most representative of the relationship between LOI and CPM. The line on the graph represents the best fit linear curve based on performing regression statistics for the data points taken. This curve has a coefficient of simple correlation (R) of 0.90 and a coefficient of simple determination ($R^2$) of 0.81. An R value exceeding 0.85 is typically considered a good fit. Therefore, the test data indicates a good correlation between LOI and CPM. The linear equation is:

$$LOI=0.000922*(CPM)+0.847251$$

EXAMPLE 2

The threshold set point in the video processor was varied to determine its effect on the data being processed. This adjustment was made to evaluate if improvement of the imaging system low end resolution could be obtained. The first adjustment was to reduce the threshold value by 75%. This change resulted in the average CPM value increasing by more than 10,000%. At 50% of the original threshold value the CPM value increased by more than 7,000%. With a 25% threshold reduction the CPM value increased by 1,686%, and for a 20% reduction the CPM value increased by 757%. These values indicate that the threshold set point used during the majority of the testing was very close to the optimal point for accurately detecting hot particles in the fly ash and filtering out noise that could produce false counts.

While no improvement in low end resolution was obtained as a result of the threshold variation, the similar line slopes does suggest that a substantially linear curve can be established for providing real time LOI estimates based on measured CPM from the imaging system. The linear curve equation for the two adjusted threshold data points is:

$$LOI=0.001157*(CPM)+0.874087$$

The above unburned carbon tests demonstrate that a repeatable substantially linear correlation between plant determined LOI and imaging system measured CPM can be obtained over a variety of boiler operating conditions. This correlation can be used on line to determine the quantity of LOI in the fly ash, and to provide the plant operators with timely LOI information reflecting the effect of changes to burner and boiler operating parameters. As can be seen, the relationship is approximately 0.001*(CPM) plus between about 0.8 to 0.9=percent loss on ignition (LOI). However, the exact relationship appears somewhat dependent on the fuel composition and, in the preferred embodiment, fly ash samples are taken and analyzed in the conventional manner to fine tune the final relationship and to periodically confirm the results of the $M_{UBC}$ measurement.

Following the above, it was begun to be seen that, for high boiler loads, the background illumination for the boiler could become so high that CPM measurements became difficult. While this phenomena is generally referred to as "load" throughout this application, it includes the influence of a number of variables including load, oxygen concentration, tilts, mills in service, etc. is more accurate. For example, in some plants the "load" used is the actual coal flow. The amount of ash in the coal per unit time would be ideal but this measurement is not readily available. However, this value can be approximated by, for example, plant load which is about equal to the amount of coal and, for a given coal, a signal proportional to the total mass of ash going through the boiler can be determined. The reasoning for this is that LOI is a volume value and ($M_{UBC}$) is a mass flow per unit time value and load is used to convert between these units.

Figure 4:
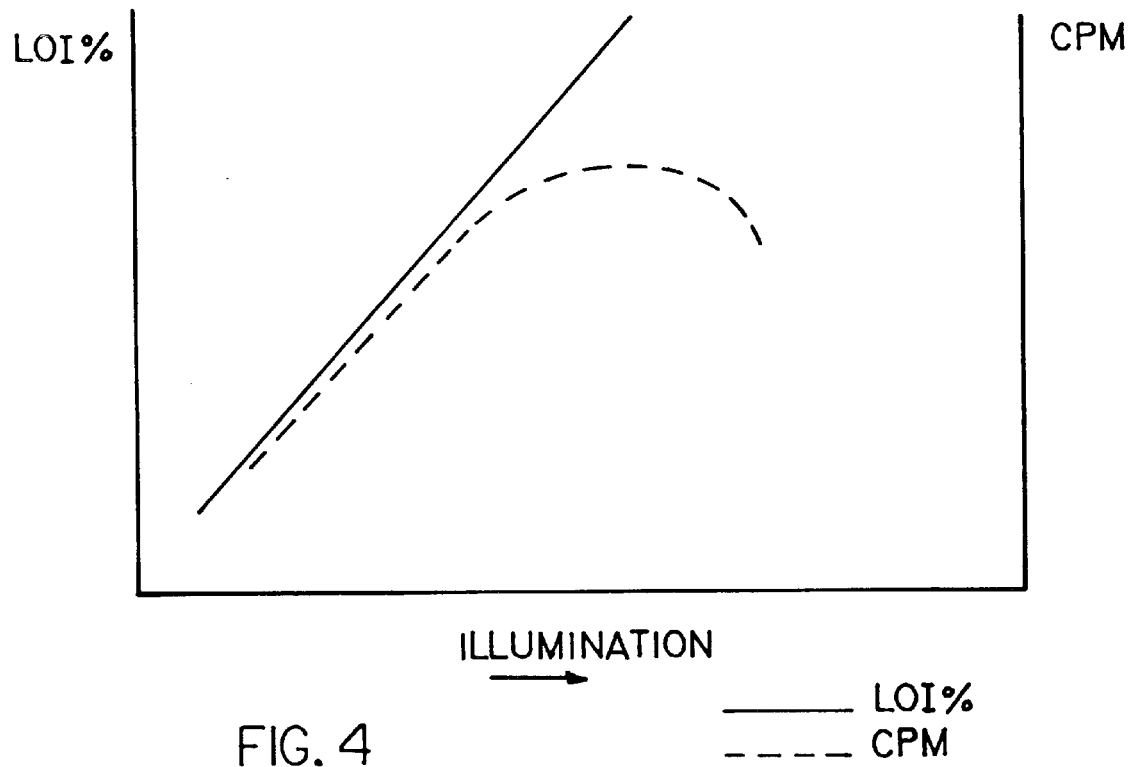
FIG. 4 is a graphical representation of the plant measured LOI vs. the imaging system measured CPM at high boiler load illustrating the problem solved by the present invention.

As best seen in FIG. 4, there is shown a graphical representation of the plant measured LOI vs. the imaging system measured CPM at high boiler load illustrating the problem solved by the present invention. Specifically, as background illumination increased CPM appeared to decrease. This phenomena is similar to why we can not see the stars during the day. More specifically, this is similar to why the dimmer stars begin to disappear in first morning light until first only the brightest stars remain and, finally, none can be seen.

Figure 5A:
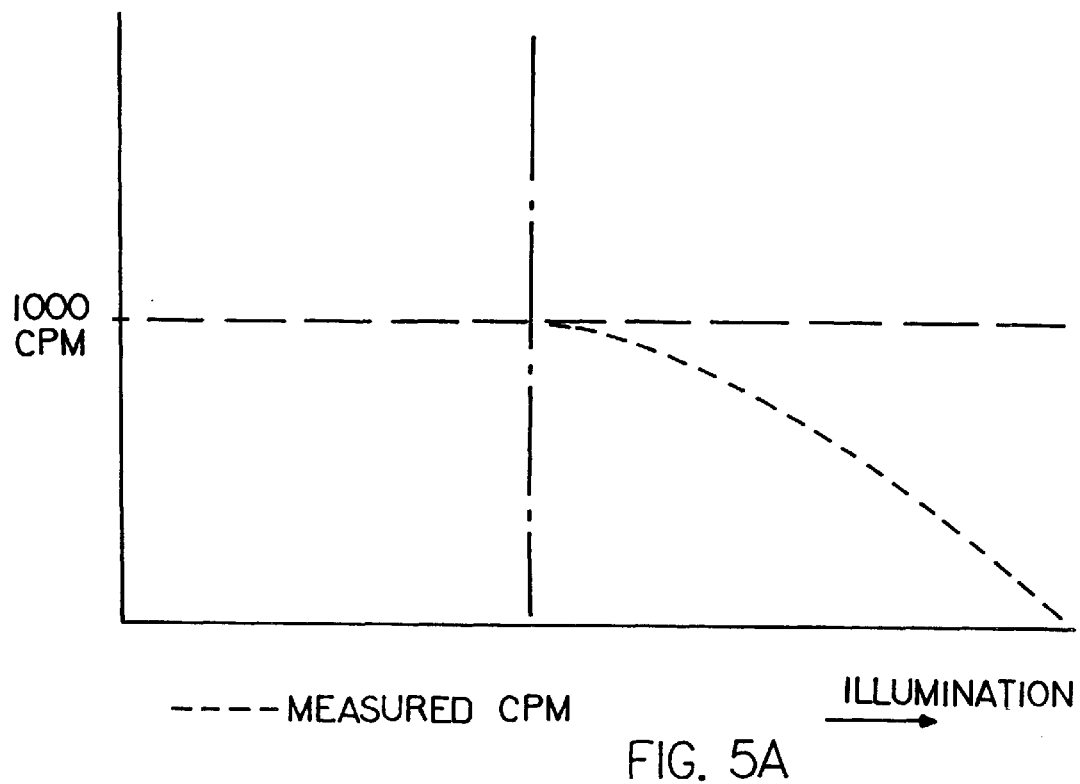
FIG. 5A is a graphical representation illustrating the effect of increasing background illumination, equivalent to increasing boiler load, on imaging system measured CPM.
Figure 5B:
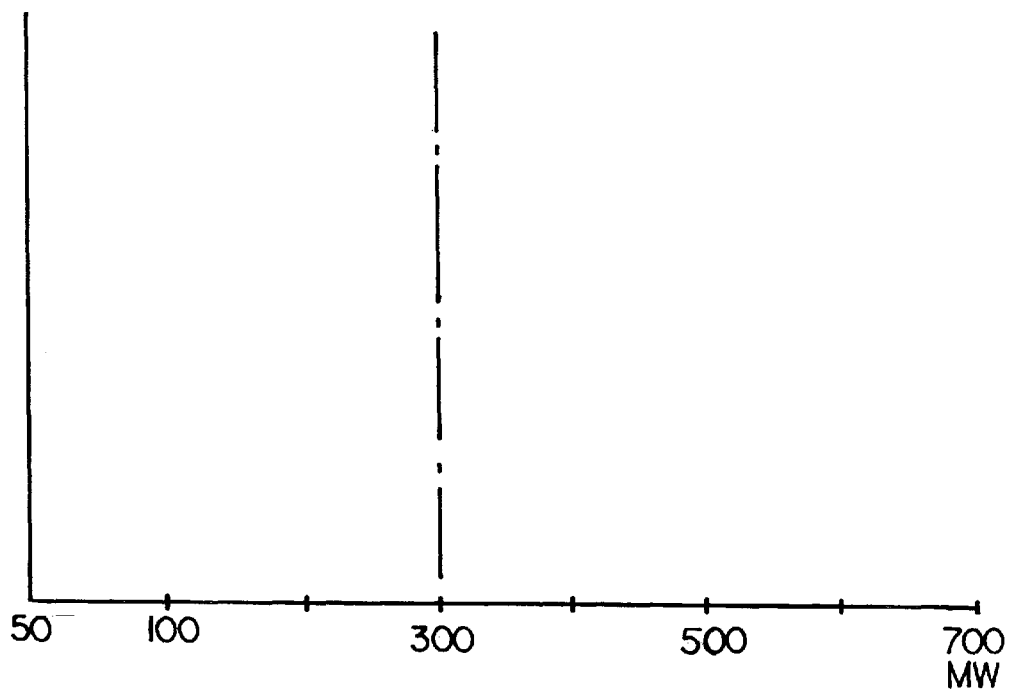
FIG. 5B is a graphical representation illustrating the corresponding threshold of increasing background illumination at its equivalent boiler load.

FIG. 5A is a graphical representation illustrating the effect of increasing background illumination, equivalent to increasing boiler load, on imaging system measured CPM. This test was performed using a fixed 1000 CPM light source and measured the CPM as the background illumination was increased generally corresponding to boiler load. FIG. 5B is a graphical representation illustrating the approximate corresponding threshold of increasing background illumination at its equivalent boiler load to that shown in FIG. 5A. From these tests, it was believed that it was necessary to add a correction factor to the output signal 20 representative of the counts per minute of moving particles provided by imaging processor 16.

Figure 6:
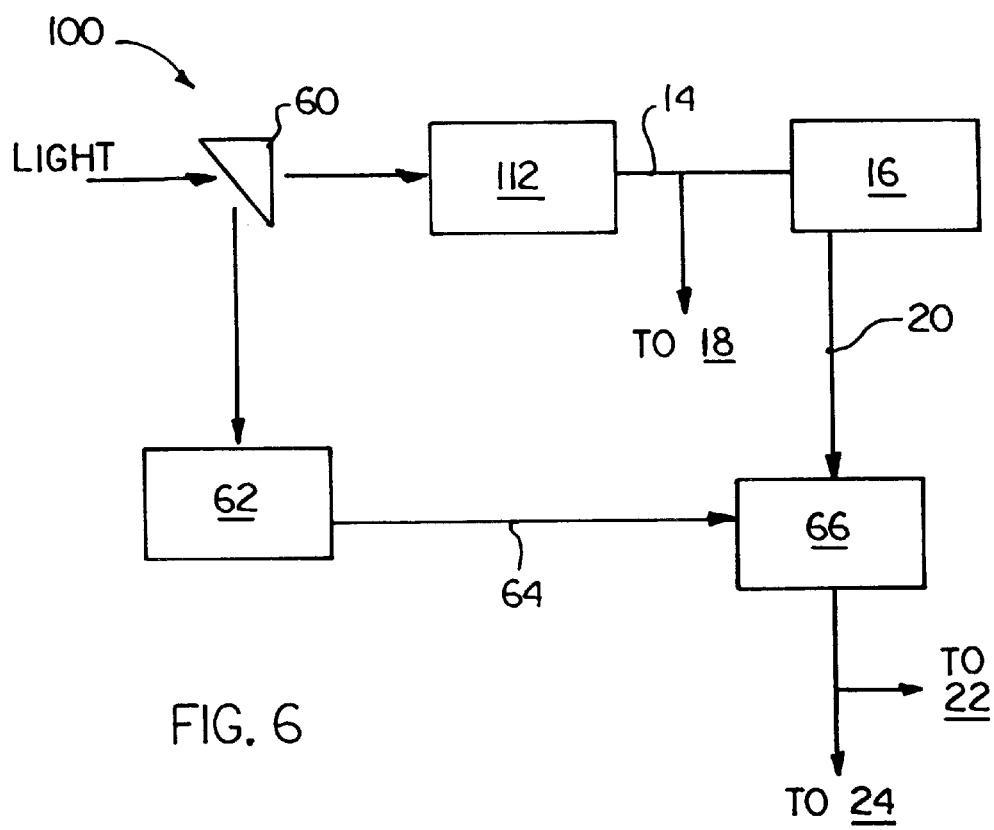
FIG. 6 is a block diagram illustrating an improved unburned carbon and other combustibles measuring apparatus for a fossil-fueled boiler constructed according to the present invention to solve the problem shown in FIGS. 5A and 5B.

As best seen in FIG. 6, there is shown a block diagram illustrating an improved unburned carbon and other combustibles measuring apparatus for a fossilfueled boiler constructed according to the present invention to solve the problem shown in FIGS. 5A and 5B. In the preferred embodiment, the apparatus for counting the moving particles includes an imaging camera 12 for providing an output signal 14 to an image processor 16. In the preferred embodiment, output signal 14 is also received by a CRT display 18 for providing a visual display of the output of the imaging camera. Imaging processor 16 provides a second signal 20 representative of the counts per minute of moving particles.

In addition to this part of the apparatus originally disclosed in the parent application, the present invention includes a splitter 60 located in front of the imaging camera 14 which diverts a portion of the light from the boiler to a scene illumination sensor 62. Scene illumination sensor 62 is preferably an optical pyrometer. The output signal 64 from sensor 62 is combined with the second signal 20 from imaging processor 16 according to the formulas: $M_{UBC}$=m(CPM)+b(SIS−$SIS_R$), where m is the slope and b is the y-intercept and % LOI=$C_1$+$C_2$(CPM/LOAD)+$C_3$(SIS−$SIS_R$) where LOAD is boiler load in megawatts and SIS−$SIS_R$ is the difference between the scene illumination sensor output at load and the scene illumination sensor output at its reference point, thereby correcting for the effect of background illumination at high boiler load. This results in an increase in dynamic range of the present invention of from about 2:1 to about 10:1!

Certain modifications and improvements will occur to those skilled in the art upon a reading of the foregoing description. By way of example, the relationship between particle count and LOI could be exponential rather than linear for some fuels. Also, the exact correlation may vary form plant to plant because of different installation location, fuel, etc. However, direct LOI information could be obtained after some in-situ calibration. It should be understood that all such modifications and improvements have been deleted herein for the sake of conciseness and readability but are properly within the scope of the following claims.

I claim:

1. An unburned carbon and other combustibles monitoring and control system for a fly ash producing fossil-fueled boiler, said boiler including at least one burner, a furnace section, and an exit for the hot gases produced by said boiler, said system comprising:
   (a) means for counting hot moving particles entrained in said hot gases downstream of the furnace region of the boiler and for providing a first signal representative of the number of hot particles in said hot gases over a predetermined period of time; and
   (b) processing means for receiving said signal representative of the number of particles in said hot gases, said processing means for receiving said signal first connected to said means for counting said hot moving particles, said processing means for receiving said signal first providing a second signal representative of the mass flow of unburned carbon and other combustibles in the fly ash produced by said boiler, said second signal being a function of said first signal.

2. The apparatus according to claim 1, further including at least one air/fuel control element for controlling the air/fuel ratio of said fossil-fueled boiler and a control system connected to said control element, said control system for receiving said second signal representative of the mass flow of unburned carbon and other combustibles in the fly ash produced by said boiler and a predetermined set point for the mass flow of unburned carbon and other combustibles content of the fly ash produced by said boiler, said control system being operable to adjust said air/fuel control element in response to said second signal and said set point.

3. The apparatus according to claim 2, wherein said first air/fuel control element is a damper for controlling the air flow to said burner.

4. The apparatus according to claim 1, wherein said fossil-fueled boiler is a pulverized coal boiler.

5. The apparatus according to claim 1, wherein said means for counting moving hot particles entrained in said hot gases is located downstream of said furnace section.

6. The apparatus according to claim 1, wherein said fossil-fueled boiler includes a superheater located downstream of said furnace section.

7. The apparatus according to claim 6, wherein said means for counting hot moving particles entrained in said hot gases is located downstream of said superheater.

8. The apparatus according to claim 6, wherein said fossil-fueled boiler includes a reheater located downstream of said superheater.

9. The apparatus according to claim 8, wherein said means for counting hot moving particles entrained in said hot gases is located downstream of said superheater and upstream of said reheater.

10. An unburned carbon and other combustibles monitoring system for a fly ash producing fossil-fueled boiler, said boiler including a furnace section and an exit for the hot gases produced by said boiler, said system comprising:

(a) an infrared imaging camera for counting hot moving particles entrained in said hot gases downstream of the furnace region of the boiler and for providing a first signal representative of the number of hot particles in said hot gases over a predetermined period of time; and (b) processing means connected to said infrared imaging camera for counting said hot particles, said processing means for receiving said signal first of the number of hot particles in said hot gases and providing a second signal representative of the mass flow of unburned carbon and other combustibles in the fly ash produced by said boiler, said second signal being a function of said first signal, said mass flow of unburned carbon and other combustibles content ($M_{UBC}$) being substantially related to said hot particle count (CPM) according to the formulas: $M_{UBC}=m(CPM)+b(SIS-SIS_R)$, where m is the slope and b is the y-intercept, and % $LOI=C_1+C_2(CPM/LOAD)+C_3(SIS-SIS_R)$.

11. The apparatus according to claim 10, further including a video display connected to said infrared imaging camera for providing a visual display of said hot particle count in said hot gases.

12. The apparatus according to claim 10, further including a video display connected to said processing means for providing a visual display of said second signal representative of said mass flow of unburned carbon and other combustibles in the fly ash produced by said fossil-fueled boiler.

13. The apparatus according to claim 10, wherein said fossil-fueled boiler is a pulverized coal boiler.

14. The apparatus according to claim 10, wherein said infrared imaging camera for counting hot moving particles entrained in said hot gases is located downstream of said furnace section.

15. The apparatus according to claim 10, wherein said fossil-fueled boiler includes a superheater located downstream of said furnace section.

16. The apparatus according to claim 15, wherein said infrared imaging camera for counting hot moving particles entrained in said hot gases is located downstream of said superheater.

17. The apparatus according to claim 15, wherein said fossil-fueled boiler includes a reheater located downstream of said superheater.

18. The apparatus according to claim 17, wherein said infrared imaging camera for counting hot moving particles entrained in said hot gases is located downstream of said superheater and upstream of said reheater.

19. An unburned carbon and other combustibles monitoring and control system for a fly ash producing fossil-fueled boiler, said boiler including at least one burner, a furnace section, and an exit for the hot gases produced by said boiler, said system comprising:

(a) an infrared imaging camera for counting hot moving particles entrained in said hot gases downstream of the furnace region of the boiler and for providing a first signal representative of the number of hot particles in said hot gases over a predetermined period of time;

(b) processing means for receiving said first signal of the number of particles in said hot gases, said processing means for receiving said first signal connected to said infrared imaging camera, said processing means providing a second signal representative of the mass flow of unburned carbon and other combustibles in the fly ash produced by said boiler, said second signal being a function of said first signal, said mass flow of unburned carbon and other combustibles content ($M_{UBC}$) being substantially related to said hot particle count (CPM) according to the formulas: $M_{UBC}=m(CPM)+b(SIS-SIS_R)$, where m is the slope and b is the y-intercept and % $LOI=C_1+C_2(CPM/LOAD)+C_3(SIS-SIS_R)$; and (c) at least one air/fuel control element for controlling the air/fuel ratio of said fossil-fueled boiler and a control system connected to said control element for receiving said second signal representative of the mass flow of unburned carbon and other combustibles in the fly ash produced by said boiler and a predetermined set point for the mass flow of unburned carbon and other combustibles in the fly ash produced by said boiler, said control system being operable to adjust said air/fuel control element in response to said second signal and said set point.

20. The apparatus according to claim 19, wherein said at least one air/fuel control element is a damper for controlling the air flow to said burner.

21. The apparatus according to claim 19, wherein said fossil-fueled boiler is a pulverized coal boiler.

22. The apparatus according to claim 19, wherein said infrared imaging camera for counting hot moving particles entrained in said hot gases is located downstream of said furnace section.

23. The apparatus according to claim 19, wherein said fossil-fueled boiler includes a superheater located downstream of said furnace section.

24. The apparatus according to claim 23, wherein said infrared imaging camera for counting hot moving particles entrained in said hot gases is located downstream of said superheater.

25. The apparatus according to claim 23, wherein said fossil-fueled boiler includes a reheater located downstream of said superheater.

26. The apparatus according to claim 25, wherein said infrared imaging camera for counting hot moving particles entrained in said hot gases is located downstream of said superheater and upstream of said reheater.

27. The apparatus according to claim 19, further including a video display connected to said infrared imaging camera for providing a visual display of said hot particle count in said hot gases.

28. The apparatus according to claim 19, further including a video display connected to said processing means for providing a visual display of said second signal representative of said mass flow of unburned carbon and other combustibles content of the fly ash produced by said fossil-fueled boiler.

29. A method for monitoring the mass flow of unburned carbon and other combustibles in the fly ash being produced by a fly ash producing fossil-fueled boiler, said boiler including at least one burner, a furnace section, and an exit for the hot gases produced by said boiler, said method comprising the steps of:

(a) counting hot moving particles entrained in said hot gases downstream of the furnace region of the boiler and providing a first signal representative of the number of hot particles in said hot gases over a predetermined period of time; and (b) receiving said signal representative of the number of hot particles in said hot gases and providing a second signal representative of the mass flow of unburned carbon and other combustibles in the fly ash produced by said boiler, said second signal being a function of said first signal.

30. A method for monitoring the mass flow of unburned carbon and other combustibles in the fly ash being produced by a fly ash producing fossil-fueled boiler, said boiler including a furnace section and an exit for the hot gases produced by said boiler, said method comprising the steps of:

(a) counting hot moving particles entrained in said hot gases downstream of the furnace region of the boiler and providing a first signal representative of the number of hot particles in said hot gases over a predetermined period of time; and (b) receiving said signal representative of the number of hot particles in said hot gases and providing a second signal representative of the mass flow of unburned carbon and other combustibles content of the fly ash produced by said boiler, said second signal being a function of said first signal, said mass flow of unburned carbon and other combustibles content ($M_{UBC}$) being substantially related to said hot particle count (CPM) according to the formulas: $M_{UBC}=m(CPM)+b(SIS-SIS_R)$, where m is the slope and b is the y-intercept, and % $LOI=C_1+C_2(CPM/LOAD)+C_3(SIS-SIS_R)$.

31. A method for monitoring the mass flow of unburned carbon and other combustibles in the fly ash being produced by a fly ash producing fossil-fueled boiler, said boiler including at least one burner, a furnace section, and an exit for the hot gases produced by said boiler, said method comprising the steps of:

(a) counting hot moving particles entrained in said hot gases downstream of the furnace region of the boiler and providing a first signal representative of the number of hot particles in said hot gases over a predetermined period of time;

(b) receiving said signal representative of the number of hot particles in said hot gases and providing a second signal representative of the mass flow of unburned carbon and other combustibles in the fly ash produced by said boiler, said second signal being a function of said first signal, said mass flow of unburned carbon and other combustibles content ($M_{UBC}$) being substantially related to said hot particle count (CPM) according to the formulas: $M_{UBC}=m(CPM)+b(SIS-SIS_R)$, where m is the slope and b is the y-intercept, and % $LOI=C_1+C_2(CPM/LOAD)+C_3(SIS-SIS_R)$; and (c) controlling the air/fuel ratio of said fossil-fueled boiler by at least one air/fuel control element and a control system connected to said control element for receiving said second signal representative of the mass flow of unburned carbon and other combustibles in the fly ash produced by said boiler and a predetermined set point for the mass flow of unburned carbon and other combustibles in the fly ash produced by said boiler, said control system being operable to adjust said air/fuel control element in response to said second signal and said set point.

* * * * *